United States Patent [19]
Hoffman

[11] Patent Number: 5,252,154
[45] Date of Patent: Oct. 12, 1993

[54] GASKET SYSTEM

[75] Inventor: Kenneth P. Hoffman, Chagrin Falls, Ohio

[73] Assignee: Tremco, Inc., Beachwood, Ohio

[21] Appl. No.: 743,000

[22] Filed: Aug. 9, 1991

[51] Int. Cl.$^5$ .................................................. E04B 2/00
[52] U.S. Cl. .................................. 156/71; 156/304.6; 52/235
[58] Field of Search ................. 156/71, 304.6, 304.1; 52/235, 400

[56] References Cited

U.S. PATENT DOCUMENTS

| | | | |
|---|---|---|---|
| 3,400,030 | 9/1968 | Burger | 156/159 X |
| 4,067,162 | 1/1978 | Howorth | 52/235 X |
| 4,631,884 | 12/1986 | Reynolds | 52/235 |
| 5,065,557 | 11/1991 | Laplante et al. | 52/510 X |
| 5,124,533 | 6/1992 | Dommer et al. | 156/304.6 |

Primary Examiner—David A. Simmons
Assistant Examiner—Mark A. Osele
Attorney, Agent, or Firm—Konrad H. Kaeding; David P. Dureska

[57] ABSTRACT

The present invention relates generally to window glazing systems, particularly for high-rise commercial buildings. More specifically, the gasket system of the present invention is directed to a gasket system which can be partially fabricated in pieces off site, then the pieces are heat bonded together on site to thereby provide a substantially unitary gasket construction which is capable of sealing around the perimeter of multiple windows of a commercial building.

8 Claims, 5 Drawing Sheets

GASKET SYSTEM

FIELD OF THE INVENTION

The present invention relates generally to window glazing systems, particularly for commercial buildings having one or more elevations consisting essentially of adjacent windows attached to a building frame; the glazing system of the present invention can be used in buildings erected by prefabrication or by unitized construction techniques. Specifically, the gasket system of the present invention is directed to prefabricating gasket sections in a factory or the like, then heat bonding the pieces together on-site to thereby provide a substantially unitary, single gasket construction which is capable of sealing around all windows on one or more sides or elevations of a building.

BACKGROUND OF THE INVENTION

Rubber gaskets are known generally in window glazing and are generally prefabricated at a factory and incorporated into a glazing system on site. From a practical standpoint, a single gasket for an entire elevation of a high-rise building generally cannot be fabricated at an off-site location, then shipped and installed.

As a result, gaskets are generally incorporated into glazing systems in a piece-meal fashion. Seams between gaskets are generally sealed using a caulk, typically a butyl or silicone sealant. However, silicone sealants generally do not have exceptional adhesion to gasket material, and butyl sealants often lack longevity; consequently, such systems must be maintained and often replaced over the life of a building. Furthermore, such caulking operations can be messy, unsightly and prone to workman error.

Also, if a window is broken or otherwise needs to be replaced (such as due to desiccant exhaustion and subsequent humidity fogging), such a repair or replacement can be labor intensive and expensive where the gasket system has seams which are sealed using a silicone or butyl sealant.

Consequently, it is an object of the present invention to provide a high-rise gasket system which is substantially unitary upon final installation, so caulking or sealing between gasket seams is no longer necessary.

Other objects and features of the present invention will become apparent to those of ordinary skill in the art upon further reading of this specification and accompanying claims.

SUMMARY OF THE INVENTION

1. The Gasket Material

Gasket materials useful for the present invention include any elastomeric or substantially elastomeric materials which can be molded or extruded into any one of a number of configurations and later bonded to the same or similar type material using heat, optionally together with pressure, rubber bonding cement and/or the like. By way of example, such gasket materials might include any one of a number of natural or synthetic rubbers (thermoplastic or thermoset). Useful gasket materials of the present invention include natural rubber, polychloroprene, butadiene-styrene copolymers, acrylonitrilebutadiene copolymers, ethylenepropylenediene ("EPDM") rubbers, synthetic polyisoprenes, butyl rubbers, polyacrylo-nitriles, silicones, epichlorohydrin, polyurethanes. Thermoplastic elastomers can also conceivably be used, such as any of the several block copolymers of propylene/EPDM or styrene/ethylenebutylene, wherein rigidity results from crystallization of polypropylene or polystyrene segments, which is reversible on heating. The most preferred gasket material is a material comprising EPDM and/or polychloroprene rubber.

The gasket material can further comprise any one of a number of conventional rubber additives, such as antioxidants, fillers, pigments, plasticizers, solvents, UV stabilizers and the like.

2. Gasket Configuration

The preferred gasket configurations of the present invention include those disclosed in FIGS. 2-4. FIG. 3 shows a configuration which can be used at each corner of a window, FIG. 4 shows a configuration which can be used along the sides of the window, and FIG. 2 shows a configuration which can be used along the interior window seams of the building.

The gaskets preferably have a longitudinal rib designed to securely fit into a groove in the building frame, thereby locking the gasket in place. The gasket sections are preferably partially prefabricated and brought to the job site. The gasket sections are then preferably installed so a gasket seals around each window and the end of each gasket portion is substantially adjacent to the end of another gasket portion.

3. Bonding the Gaskets Together

The gasket ends are bonded together at the job site using heat and preferably rubber bonding cement. The gasket ends are bonded together, preferably by the device illustrated in FIGS. 1 and 5. Preferably, a conventional rubber bonding cement is applied to the gasket ends, the ends are then butted together and the device is clamped down onto the gasket ends. The device heats the abutted gasket ends by means of an electric heater which is controlled with a thermostat. After a short period of time, the device can be unclamped from the gasket, and the gasket ends are firmly bonded together.

4. The Finished Product

The resulting bonded gasket end portions are then pressed into the building frame and locked in place due to the gasket's ribbed protrusion locking onto a ridge within the frame. The resulting continuous gasket preferably seals the entire side of the building. The gasket system of the present invention does not require any subsequent caulking or additional sealing since the gasket portion edges are bonded together and dust, moisture or the like have no means for penetrating through the gasket.

In alternative embodiments of the present invention, the gasket splicing system of the present invention is used for roadway gaskets or any gasket system requiring long lengths of gasket which are impractical or inconvenient to manufacture off-site. In parking garage applications or the like, roadway gaskets can be spliced together to provide a superior, less expensive, more aesthetically pleasing seal. Other embodiments of the present invention will become obvious to those of ordinary skill in the art upon a further reading of this specification and accompanying claims.

DETAILED DESCRIPTION OF THE PREFERRED EMBODIMENT

Figure 1:
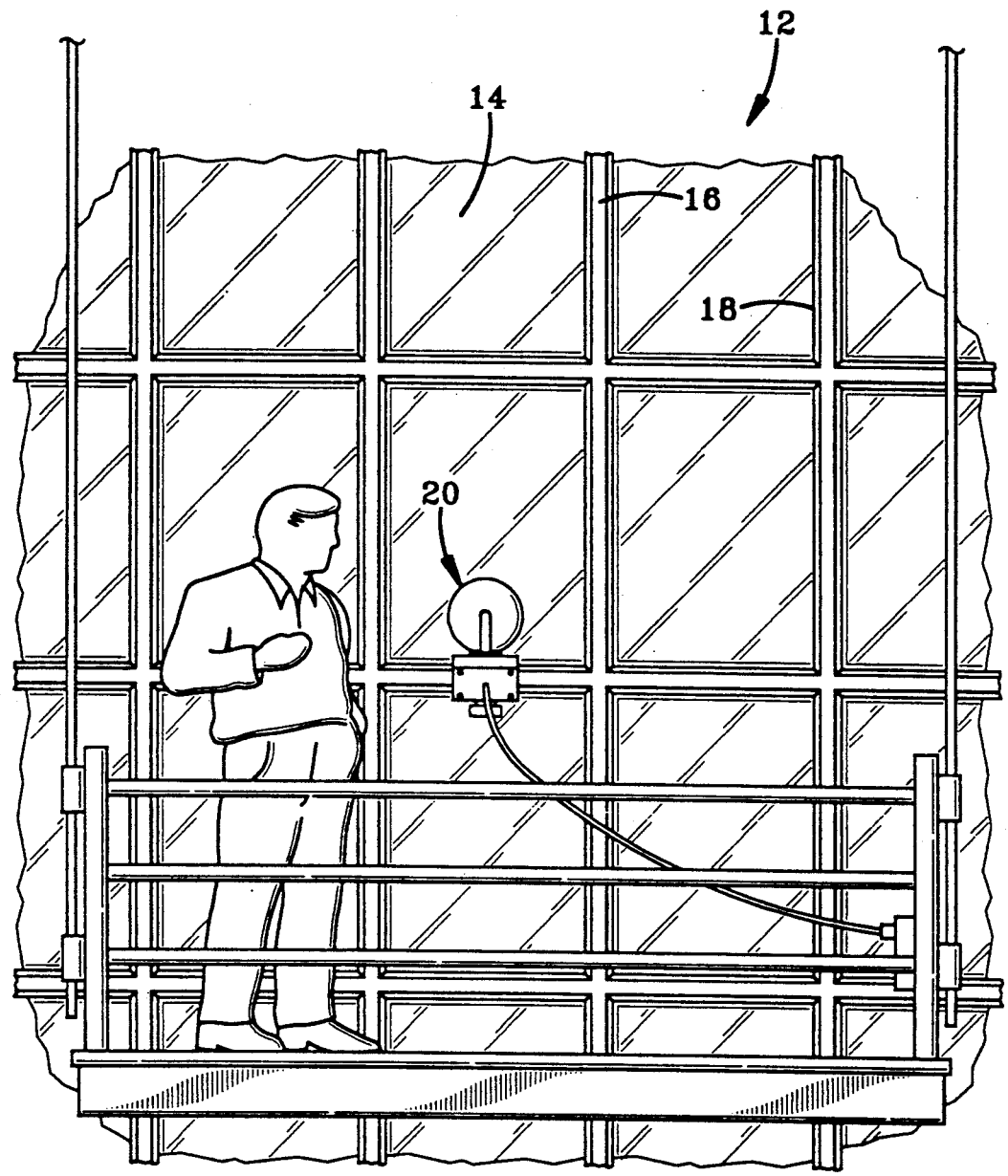
FIG. 1 is a sectional view of a high-rise building in which the preferred gasket system of the present invention is being installed around the periphery of the building's windows, and the preferred device of the present invention is shown bonding two gasket ends together at the job site.

Referring to the Figures, FIG. 1 illustrates a sectional view of a typical building 12 having a wall of windows 14 adjacent to one another and secured to a building frame 16 which extends around the periphery of each window. The windows are secured to the window frame by means of adhesive and/or mechanical means, and the frame is preferably mechanically fastened to the main structure of the building. A rubber gasket 18 is used to cover the building frame and window securing means. The gasket has a longitudinally protruding ribbed section which is pressed into a locking strip to secure the gasket to the building frame. The preferred gasket material is a material comprising EPDM, polychloroprene or silicone rubber and can further comprise any one of a number of conventional rubber additives such as antioxidants, plasticizers, pigments, fillers and the like. The gasket edges are bonded together by means of portable splicing device 20.

Figure 5:
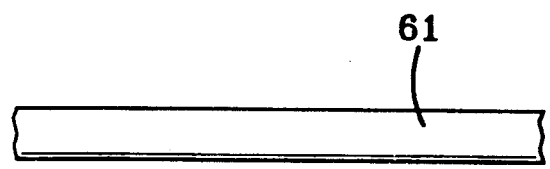
FIG. 5 illustrates a gasket section preferably manufactured off site which is useful in sealing a straight portion of a window.
Figure 6:
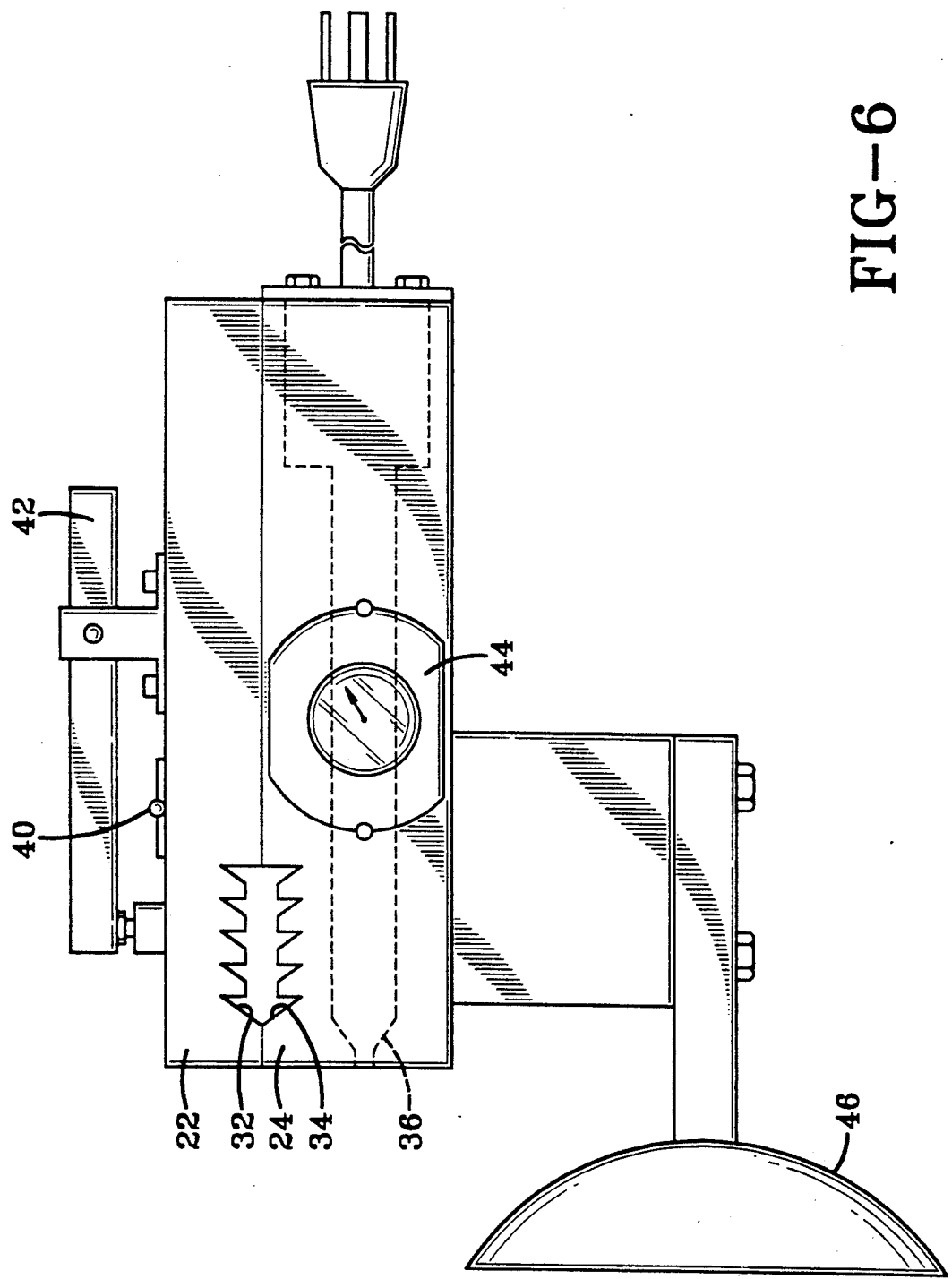
FIG. 6 is a view of the preferred device for bonding two gasket ends together in accordance with the present invention.
Figure 7:
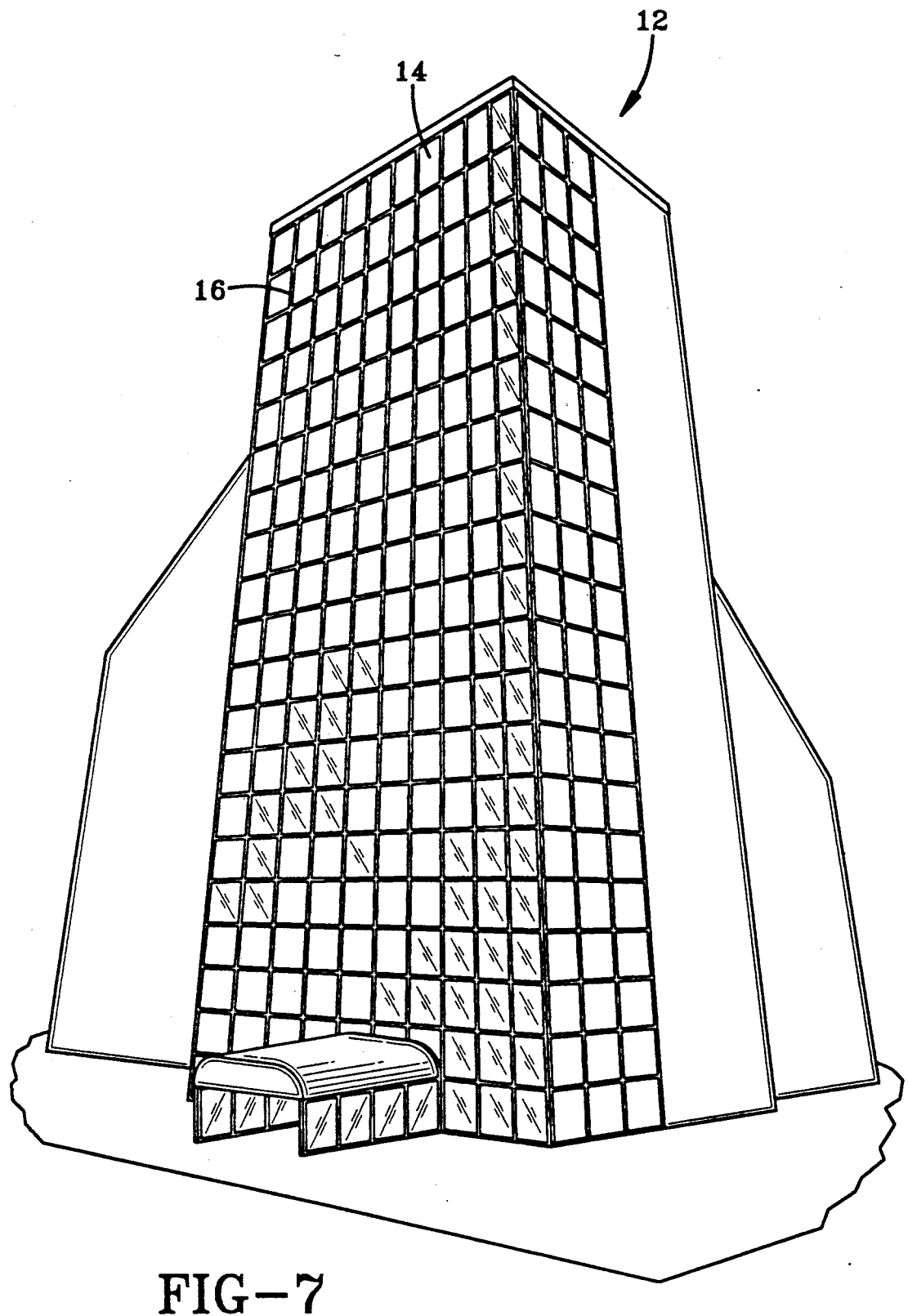
FIG. 7 is a view of a high-rise building comprising the preferred gasket system of the present invention.

Portable splicing device 20 is shown in more detail in FIG. 6. As shown in FIG. 5, the device comprises an upper mold 22 and a lower mold 24 which can be separated by means of hinge 40 and toggle clamp 42. Once opened, two gasket ends can be coated with a conventional rubber bonding cement, then butted together and placed between the molds. Mold indentations 32 and 34 accommodate the shape of the gasket ends, and when the molds are closed together by means of toggle clamp 42 and hinge 40, the gasket ends are securely abutted. The mold indentations preferably accommodate straight abutment splicing. Alternatively, the molds can be interchangble and an alternative mold can be designed to accomodate 45° corner splicing.

Electric heater 36 heats the molds to an appropriate temperature, typically about 400° F. for about 5 minutes. The abutted gasket ends then bond together due to the heat and bonding cement, typically within 5 minutes or so. During this waiting period, a workman can continue to apply a second device to a second set of gasket ends. A temperature gauge 44 optionally can be incorporated into the heating device to ensure that proper temperature has been obtained for rubber bonding.

The heating device is preferably secured to a glass member of the building by means of suction cup 46. Such suction cups are commonly used in the glass industry for gripping glass. Most preferably, a series of two or more suction cups are used, whereby if one suction cup fails, the remaining suction cup(s) is(are) nevertheless capable of holding the device in position.

Figure 2:
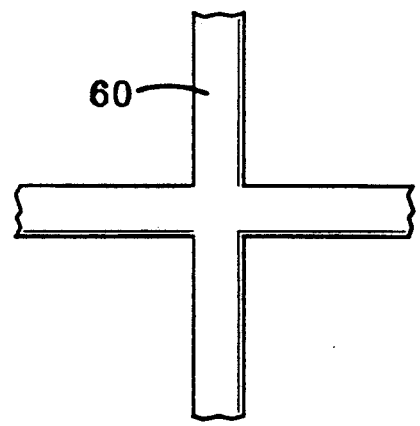
FIG. 2 illustrates a gasket section preferably manufactured off site which is useful in sealing around the windows which are interior (not at the edge or corners) of the building.
Figure 3:
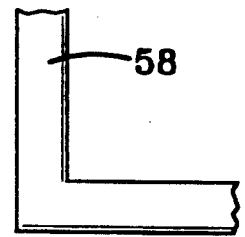
FIG. 3 illustrates a gasket section preferably manufactured off site which is useful in sealing around windows at the corners of the building.
Figure 4:
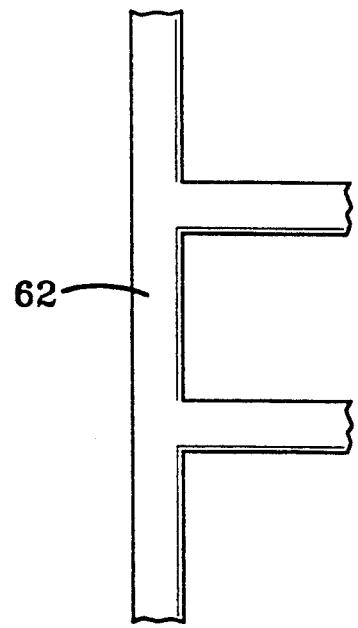
FIG. 4 illustrates a gasket section preferably manufactured off site which is useful in sealing around windows at the edges of a building.

The preferred gasket configurations of the present invention include those disclosed in FIGS. 2-5. FIG. 3 shows a gasket portion 58 having a configuration which can be used at each corner of a window. FIG. 4 shows a gasket portion 62 having a configuration which can be used along the sides of the window, and FIG. 2 shows a gasket portion 60 having a configuration which can be used along the interior seams of the window. FIG. 5 shows a straight gasket portion 61 which can interconnect the above described gasket portions or can be used merely to seal a straight section.

The gaskets preferably have a longitudinal rib designed to securely fit into a groove in the building frame, thereby locking the gasket in place. The gasket sections are preferably partially prefabricated and brought to the job site. The gasket sections are then preferably installed so a gasket seals around each window and the end of each gasket portion is substantially adjacent to the end of another gasket portion.

The resulting bonded gasket end portions are then pressed into the building frame and locked in place due to the gasket's ribbed protrusion locking onto a ridge within the frame. The resulting continuous gasket preferably seals the entire side of the building. The gasket system of the present invention does not require any subsequent caulking or additional sealing since the gasket portion edges are bonded together and dust, moisture or the like have no means for penetrating through the gasket.

Figure 8:
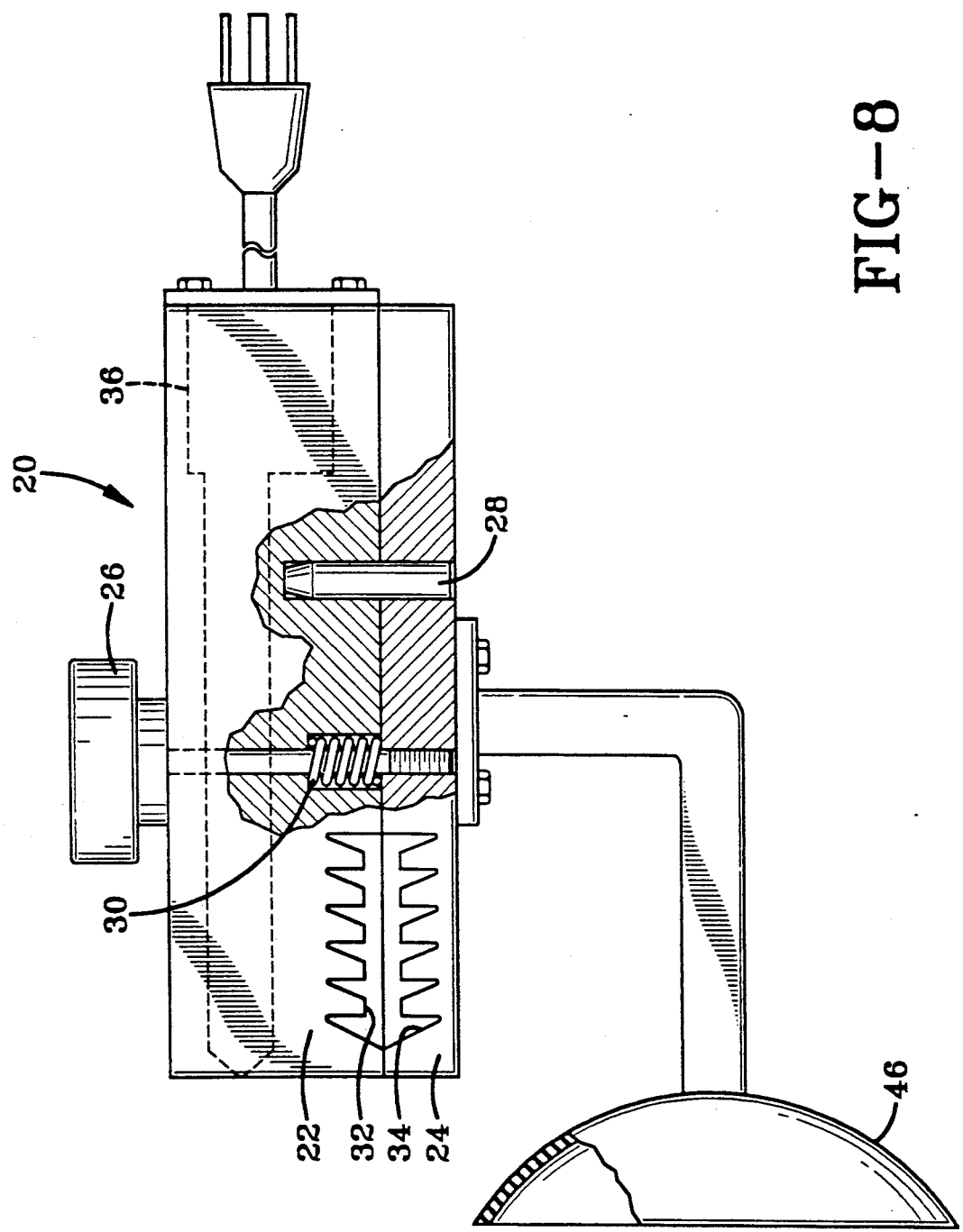
FIG. 8 is a view of an alternative device for bonding two gasket ends together in accordance with the present invention.

FIG. 8 shows an alternative design for an on-site heating unit for bonding the rubber gasket portions. In this embodiment, a tightening screw 26 and spring bias member 30 in combination with alignment pin 28 provide the mechanism for separating upper mold 22 from lower mold 24. In this embodiment, the heater 36 is located above the mold indentations 32 and 34.

In any embodiment of the present invention it is recommended that the operator be protected from electrical shock, such as by use of a conventional "ground fault interrupter" ("GFI") circuit or the like. Electrical shock can be a particular concern where the operator is working in the rain and the metal scaffold is intentionally or unintentionally grounded.

The heating device components are preferably replaceable and detachable for easy servicing and repair. Different molds can be made interchangeable with the heating device to accommodate different gaskets or gasket splicing configurations. The heating device also preferably comprises a heat resistant covering to diminish the likelihood that the operator will receive a burn from the unit during operation.

In an alternative embodiment, the gasket system is used in a roadway application, whereby a sealing gasket material is spliced together at a job site, such as a parking garage. Such on-site gasket splicing can provide a superior, less expensive, more aesthetically pleasing seal than many conventional methods. Not surprisingly, in such alternative embodiments, a suction cup is generally not a necessary component of the heating device.

While in accordance with the patent statutes, the best mode and preferred embodiment has been set forth, the scope of the invention is not limited thereto, but rather by the scope of the attached claims.

What is claimed is:

1. A method of applying a gasket system, said method comprising the steps of:

securing a first gasket member having a first end portion to a structure, securing a second gasket member to the structure adjacent to the first gasket member, said second gasket member having a second end portion in close proximity to said first end portion, abutting the two end portions together while being clamped within a heating means, applying heat with the heating means to thereby bond the two end portions together, securing the heating means to the structure by attachment means when applying heat to the two end portions, removing the heating means from the two end portions, and securing the entire gasket assembly to the structure, wherein the first and second gasket members now form substantially one continuous gasket.

2. The method of claim 1 wherein the structure is a building having a plurality of windows and the gasket is used to seal around the windows.

3. The method of claim 2 wherein the heating means comprises a compression member and releasing means which allow an operator to compress and release an upper mold in relation to a lower mold, said molds having indentations which accommodate the ends of said gasket members to securely abut said first and second gasket member ends when the ends are placed between the two molds and the molds are compressed together by the compression member, said heating means having a heating member to heat the ends of the gasket member when they are compressed together between the molds, whereby the heating action of the heating means contributes to a bonding between the ends of the two gasket means.

4. The method of claim 2 wherein an adhesive cement is applied to the ends of the gasket means prior to their being abutted together and heated.

5. The method of claim 4 wherein the gasket ends are heated to a temperature in excess of 200° F. for a period of time greater than about 2 minutes.

6. The method of claim 1 wherein the attachment means is a suction cup.

7. The method of claim 5 wherein the first and second gasket members comprise an extrusion which is inserted into a building frame member, said building frame member having a receiving member which engages the extrusion, thereby securing it to the building.

8. The method of claim 7 wherein the first and second gasket members comprise EPDM, chloroprene or silicone rubber.

* * * * *